Jan. 17, 1961      D. K. BARNETT      2,968,472

MIXER

Filed April 23, 1958      4 Sheets-Sheet 2

INVENTOR.
DONALD K. BARNETT
BY
Woodhams, Blanchard & Flynn
ATTORNEYS

Jan. 17, 1961  D. K. BARNETT  2,968,472
MIXER
Filed April 23, 1958  4 Sheets-Sheet 4

INVENTOR.
DONALD K. BARNETT
BY
Woodhams Blanchard and Flynn
ATTORNEYS

United States Patent Office 2,968,472
Patented Jan. 17, 1961

2,968,472

MIXER

Donald K. Barnett, Anderson, Ind., assignor to Winkel Machine Company, Inc., Watervliet, Mich., a corporation of Michigan Filed Apr. 23, 1958, Ser. No. 730,438

9 Claims. (Cl. 259—2)

This invention relates to a machine for mixing battery paste and, more particularly relates to a mixing machine wherein cooling air is suplied to the material as it is mixed and wherein noxious materials produced during the mixing operation are continuously withdrawn from within the mixing container.

In the preparation of paste to be subsequently placed in the interstices of a battery grid, lead oxide powder together with minor paste ingredients are placed in a paste mixer and made into paste by the addition of dilute sulphuric acid. The reaction between the lead oxide and the sulphuric acid is highly exothermic and some provision must be made for cooling the paste during the reaction. Otherwise, the temperature of the paste will rise to an excessive level and an unsatisfactory paste will result. Further, the paste, if it is not cooled, will tend to harden before it can be applied to the grids. In addition, the paste mixing operation is potentially hazardous, since lead oxide dust, which is toxic, may be released into the ambient atmosphere where it may be inhaled by workmen.

While a variety of different mixing devices have been used for mixing battery paste, none of these devices have been completely satisfactory. In particular, certain prior art devices have been incapable of effectively cooling the paste during the mixing operation while others did not have adequate safeguards to prevent the lead dust from exiting into the ambient atmosphere. Devices, which have been satisfactory both as regards cooling of the paste and preventing lead oxide dust from reaching the ambient atmosphere, have been unsatisfactory for other reasons, usually, because they were extremely expensive and/or inconvenient to use.

Accordingly, it is an object of this invention to provide an improved mixing machine for mixing battery paste, which machine is provided with means for cooling the paste during the mixing operation and is also provided with means for preventing noxious materials in the mixing container from reaching a location where they might be inhaled by a workman.

It is a further object of this invention to provide an improved mixing machine, as aforesaid, in which two fans are provided, one of said fans being utilized to blow cooling air into the paste as it is mixed and the other of said fans being adapted to remove the noxious powdery materials from the mixing container to prevent such noxious materials from reaching a location where they could be inhaled by a workman.

It is a further object of this invention to provide an improved mixing machine, as aforesaid, in which the exhaust fan is of such capacity that it not only removes the cooling air supplied by the input fan but also creates a partial vacuum within the container and thereby causes air to be drawn from the ambient atmosphere into the container whereby noxious materials are prevented from exiting from the mixing container except through the exhaust fan.

It is a further object of this invention to provide an improved mixing machine, as aforesaid, which is inexpensive to manufacture, reliable in operation, and which may be operated with a minimum of operational and maintenance expense.

Other objects and advantages of this invention will become apparent to those acquainted with equipment of this type upon reading the following description and inspecting the accompanying drawings, in which.

General description

Figure 1:
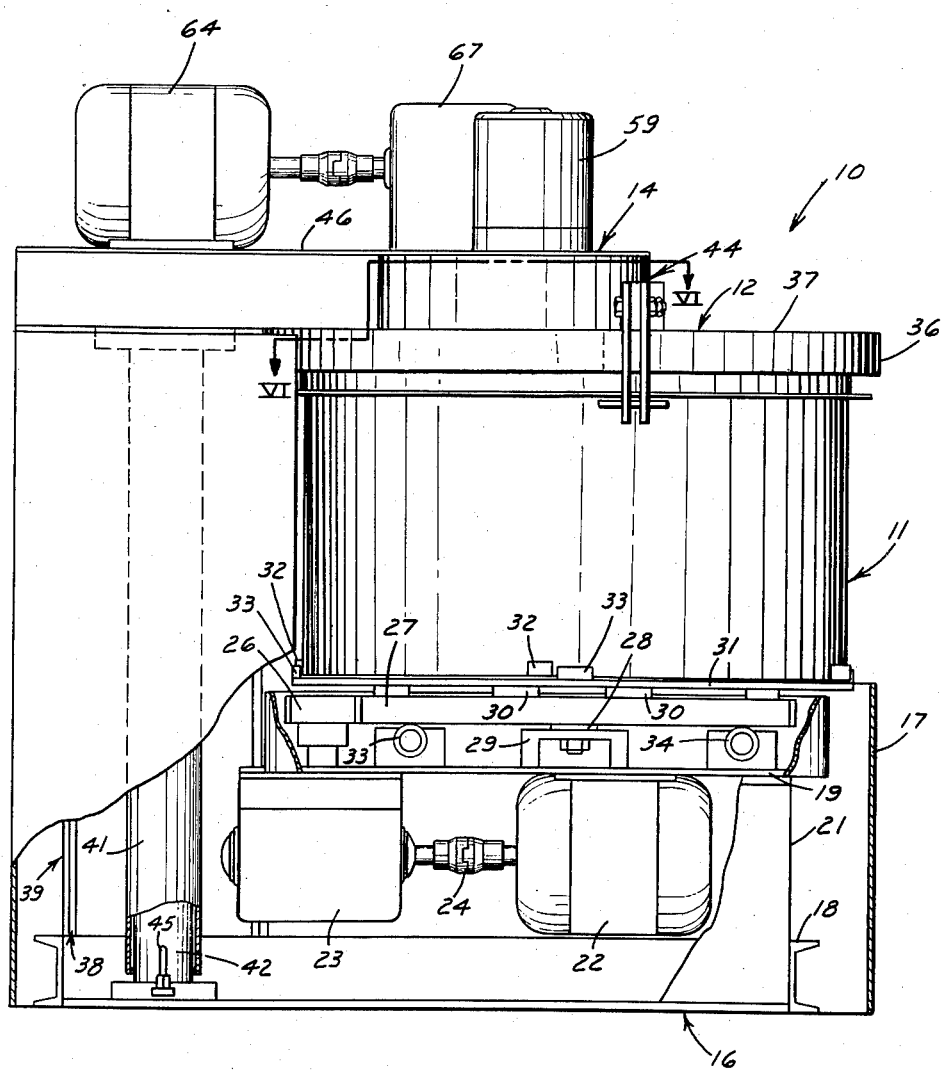
Figure 1 is a partially broken away, side elevational view of the mixing machine.

In general, the mixing machine 10 includes a container 11 which is adapted to receive the ingredients to be mixed. A cover structure 12 is loosely received over the open upper end of the container 11. A pair of fan structures 13 and 14 are mounted on the cover structure. The first or input fan structure 13 has an inlet opening communicating with the ambient atmosphere and an outlet opening extending through the cover structure and communicating with the interior of the container. The second or exhaust fan structure 14 has an inlet opening extending through the cover structure and communicating with the interior of the container and has an outlet opening communicating with suitable disposal means for the dust discharged from the mixer. The second fan structure 14 operates to remove a greater quantity of air than is forced into the container by the first fan structure 13. Thus, a slight vacuum is created by the second fan structure within the container and this causes air to enter into the container between the hood and the container, which air is then exhausted by the exhaust fan. For purposes of convenient reference in the following description and claims, the second or exhaust fan structure 14 which withdraws a greater amount of air than is forced into the container by the first or input fan structure, shall be hereinafter described as having a greater capacity than does the first or input fan structure.

Detailed description

The mixing machine 10 has a base frame 16 which includes a casing 17 of suitable material, such as sheet metal, and a channel shaped support beam 18. A housing 21 is supported on beam 18 and has a support plate 19 secured to the upper end thereof. The support plate 19 (Figure 1) supports a motor 22 and a gear box 23. The output shaft of motor 22 and the input shaft of gear box 23 are connected to each other by a suitable coupling 24. The output shaft of the gear box 23 drives a pinion 26, which pinion meshes with and drives a gear 27. The shaft 28 of the gear 27 is mounted upon a suitable bracket 29, which is secured to the support plate 19. The gear 27 is secured to a plate 31 in any suitable fashion, such as by blocks 30. The container 11 is received on the plate 31 and is adapted to be rotated thereby, by means of the structure including the co-operating blocks 32 and 33 on the container 11 and the plate 31, respectively. The gear 27 is supported by roller structures 33 and 34 which are mounted upon the support plate 19. Thus, upon energization of the motor 22, the container will be rotated at a selected speed through the gear box 23, pinion 26, gear 27, plate 31 and blocks 32 and 33.

The cover structure 12 includes a horizontal plate 37 and a short, substantially cylindrical skirt extending downwardly from plate 37 and defining a hood 36.

The cylindrical hood 36 is adapted to completely surround the open upper edge of the container 11 and be spaced a slight distance therefrom. The plate 37 overlies and is spaced a small distance from the upper edge of container. Thus, the ambient atmosphere is free to move into the container 11 through the space between the upper edge of said container and the interior surface of the hood 36.

Figure 5:
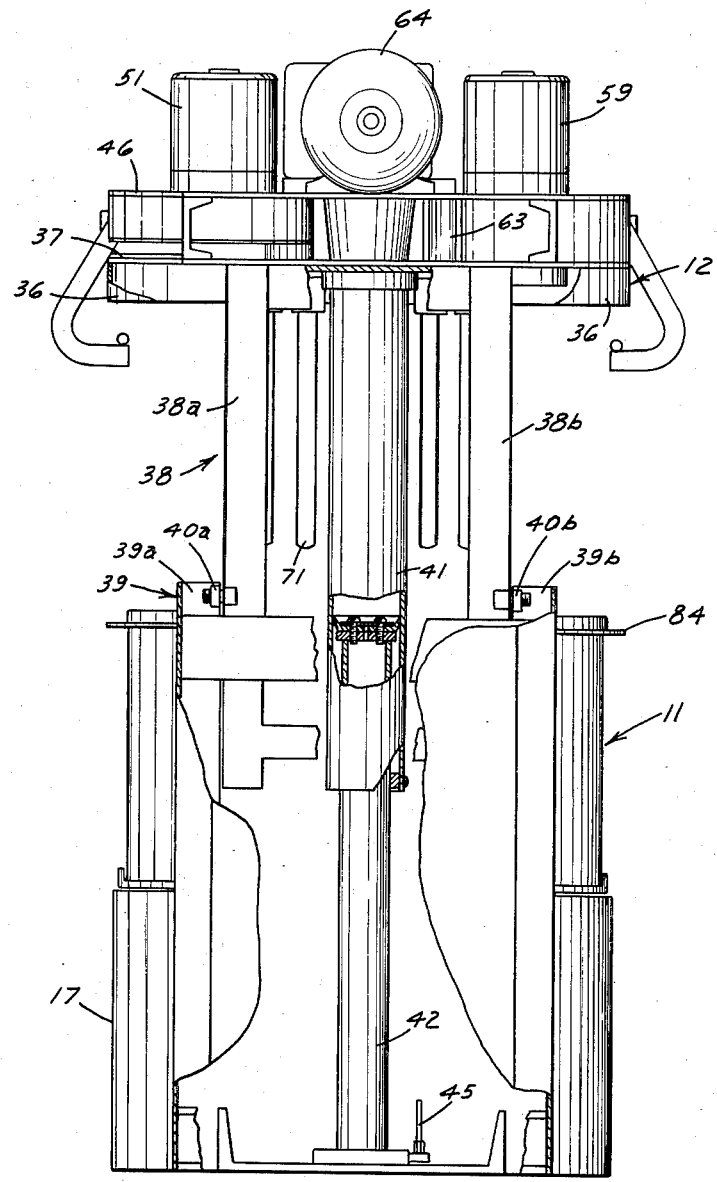
Figure 5 is a partially broken, end elevational view of the mixing machine, with the cover structure in elevated position.

The cover structure 12 is adapted to be raised and lowered vertically by any suitable mechanism. In the disclosed embodiment of the invention, a carriage 38 (Figure 5) is secured to the lower surface of plate 37 and extends downwardly therefrom. The carriage 38 is guided for vertical movement by the vertically extending guide structure 39. Thus, the carriage 38 includes a plurality of downwardly extending frame members, of which two appear at 38a and 38b in Figure 5, which are received between corresponding guide members 39a and 39b in the guide structure 39. The frame members have suitable anti-friction means, such as rollers 40a and 40b, secured thereto and contacting the guide members so that the carriage 38 may move vertically without difficulty. The plate 37 is connected to a movable cylinder 41 which is slidably mounted upon a hollow stationary piston 42. A conduit 45 communicates with the interior of piston 42. The conduit 45 is connected by any suitable valve either to a source of fluid pressure or to exhaust. Thus, when pressure fluid is admitted to the cylinder, the cover structure 12 will be moved vertically by movement of cylinder 41. Any suitable locking structure may be provided for locking the cover structure 12 in the raised position if such is found desirable or necessary.

Figure 6:
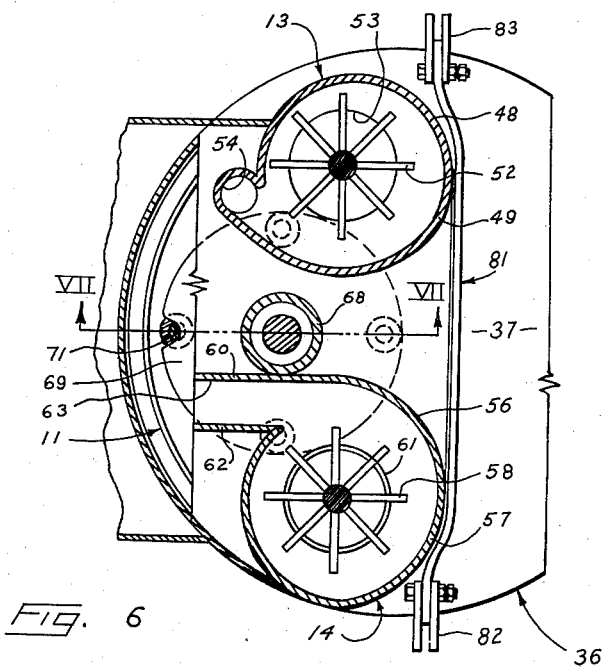
Figure 6 is a sectional view taken along the line VI—VI in Figure 1.

A housing structure 44 (Figures 2 and 3) for the input and exhaust fans is mounted on the upper surface of the plate 37. The housing structure 44 includes an upper horizontal plate 46 above plate 37. A lower plate 47 (Figure 3) is positioned between the plates 37 and 46 in the leftward portion of the housing structure 44. A side plate 48 in the shape of an involute curve extends between, and is connected to, the plates 46 and 47. The upper plate 46, the lower plate 47 and side plate 48 define the scroll 49 (Figure 2) of the input fan structure 13. A motor 51 is mounted upon the upper plate 46. The input fan 52 has a suitable hub structure which is secured to the shaft of motor 51. The lower plate 47 has a central opening 53 (Figure 4) therein which is the input opening for the fan 52. It will be observed that since the lower plate 47 is spaced from the plate 37, the ambient atmosphere may be drawn through the opening 53 (Figure 6) by rotation of the fan. A discharge conduit 54 is located at the end of the scroll 49 and extends transversely thereto through the plate 37. Thus, air circulated by the input fan 52 will discharge through the hood structure and into the container 11.

Figure 2:
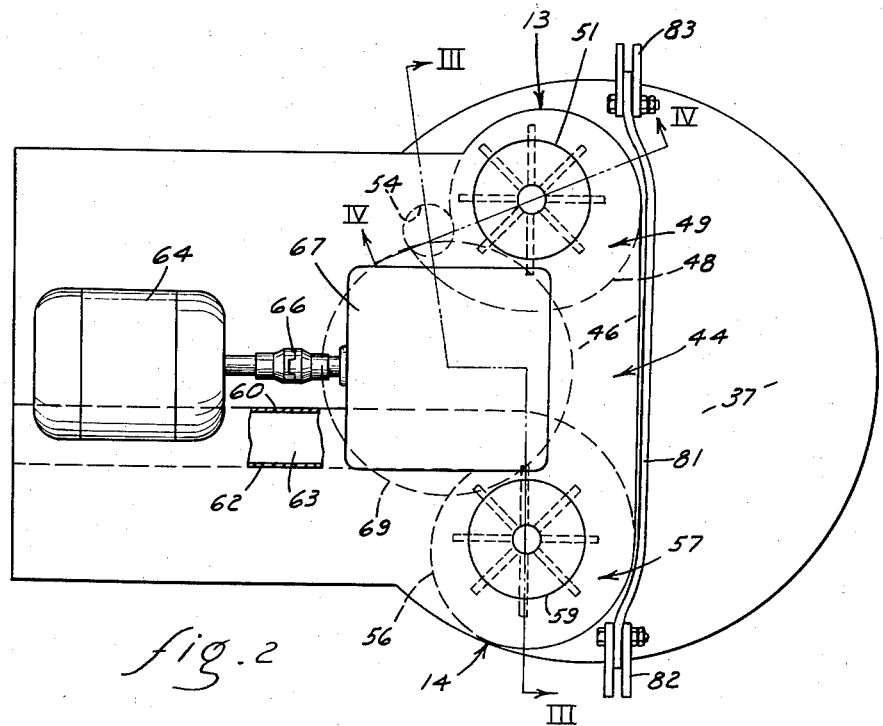
Figure 2 is a top view of the mixing machine.
Figure 3:
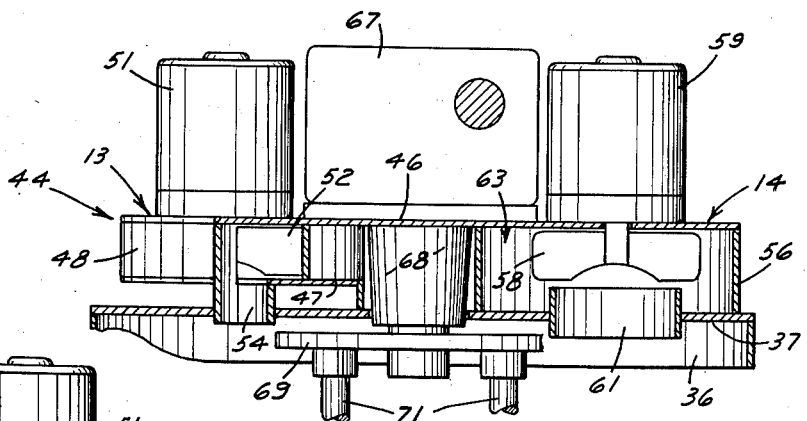
Figure 3 is a sectional view taken along the line III—III of Figure 2.
Figure 4:
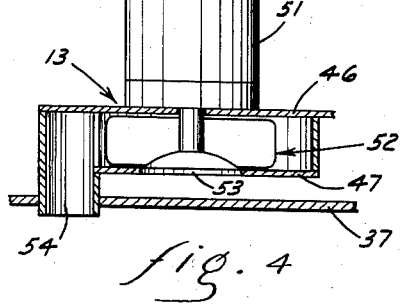
Figure 4 is a sectional view taken along the line IV—IV of Figure 2.

The housing structure 44 also has a side plate 56 in the form of an involute curve disposed between the plate 37 and the plate 46 in the rightward portion of said housing structure as appearing in Figure 3. The side plate 56, upper plate 46 and plate 37 define the scroll 57 (Figure 2) for the exhaust fan structure 14. A motor 59 is mounted upon the upper plate 46, the exhaust fan 58 has a hub structure which is mounted upon the shaft of the motor 59. A conduit 61 extends through the plate 37 into the hood 36 and also into the scroll 57 of the exhaust fan 58 and coaxial therewith. The conduit 61 serves as the inlet for the fan 58. A plate 62 (Figure 6) lies parallel with an extension 60 of the side plate 56 and defines therewith the exhaust opening 63 for the fan 58.

Figure 7:
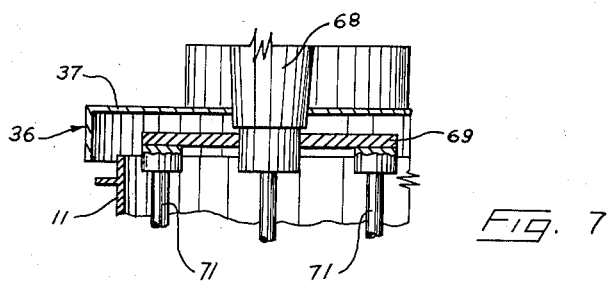
Figure 7 is a sectional view taken along the line VII—VII in Figure 6.

A motor 64 is supported upon the upper plate 46 adjacent the leftward end thereof, as appearing in Figure 2. The shaft of motor 64 is connected through a suitable coupling 66 to the input shaft of a gear box 67. The output shaft of the gear box extends through a spindle structure 68 (Figure 7) and is secured to a plate 69. The plate is positioned within the hood 36 and has a plurality of downwardly extending bars 71 thereon which bars are received within the container 11. Thus, the plate 69 may be rotated or oscillated as desired and will thereby move the mixing bars 71 in circular fashion to thoroughly agitate and mix the ingredients within the container 11.

Operation

In operation, the cover structure is first raised to its uppermost vertical position by admitting a fluid pressure through the pipe 45 and thence through the piston 42 into the cylinder 41, and, if desired or necessary, the cover may then be locked in such raised position. The ingredients for forming the battery paste are next deposited into the container 11. The cover structure 36 is then moved to its lowermost position, as by relieving the fluid pressure within the piston 42 and cylinder 41. In the lowermost position of the cover structure, the bars 71 extend substantially to the bottom of the container 11. The motors 64 and 22 may then be energized to cause, respectively, rotation of the container 11 about its vertical axis and rotation of the plate 69 and the bars 71 about the axis of the plate 69. The container 11 will be rotated clockwise as appearing in Figure 2. It will be observed that even though the plate 69 and the bars 71 overlie only a relatively small portion of the entire area of the container, all of the ingredients in the container will be thoroughly agitated since successive portions of the container are brought beneath the plate 69.

During the mixing operation the motors 51 and 59 will be energized to cause rotation of the fans 52 and 58. The fan 52 will draw the cooler ambient air therewithin through the opening 53 and will discharge such cool air through the conduit 54 into the container 11. It will be observed that the discharge conduit 54 is closely adjacent the path of travel of the bars 71 and, therefore, the cooler air discharged therethrough will contact the ingredients while they are in a condition of violent agitation and the cooling effect of such air will be substantially uniformly distributed throughout the entire mass of the ingredients. Simultaneously, the fan 58 will draw air and noxious material from the region of the container which is substantially diametrically opposite from the conduit 54. Thus, by the time any given region of the container reaches the inlet conduit 61, the cooling effect of the air introduced by fan 52 into that region will have been substantially completed so that such air and noxious materials which may be present may be withdrawn from the container without materially diminishing the efficiency of the cooling operation. The capacities of the fans 52 and 58 are such that a greater volume of air and gas will be withdrawn by the fan 58 than is supplied by the fan 52. Thus, a slight vacuum is created within the container which causes air to be drawn into the container from the ambient atmosphere through the space between the upper edge of container 11 and the interior surface of hood 36. This, in turn, prevents any noxious dust or particles from leaving the container through such space.

The blast of air delivered by the blower 13 is directed thru the conduit 54 towards the interior of the container in the form of a jet of air. This jet of air acts in the nature of an aspirator to draw in some additional air from the ambient atmosphere. This combined flow is towards the container. The blower 14 draws on the noxious gases that tend to flow towards the top of the container. Because of its large volume, blower 14 can draw these upwardly flowing gases in the form of an upwardly flowing stream which would also have an aspirating action to draw into the stream some air from the outer atmosphere. Because blower 14 has greater capacity than blower 13, there will be a slight reduction in pressure at the top of the container which will assist in the inflow of air towards the container and prevent any damaging outflow of noxious gases into the atmosphere, where it could be inhaled by a workman.

The exhaust conduit 63 may be connected to a suitable filter or to suitable apparatus whereby the noxious particles contained therein may be filtered out so that such particles are not discharged to the region around the mixing machine.

If desired, a beam 81 may be placed across the cover plate 37 in any convenient manner, as by welding or bolting, and, as indicated in Figure 2, it may be necessary to offset slightly the ends of said beams to bring them diametrically opposite each other on each side of the cover 12. The respective ends of said beam are provided with hooks 82 and 83, respectively, which hooks are so mounted that the respective points of mounting are substantially even with or slightly inside of the side walls of the container 11. A flange 84 is provided on the upper edge of the container for engagement by said hooks.

Thus, the lifting mechanism for the cover structure, can, if desired, also be used for lifting the container when it is desired to remove it from its operating position on the lower plate 31. When in said lifted posiiton, any suitable means, such as a conventional fork lift truck, can be utilized for engaging said container, removing it from its position of support by said hook, and, if and when desired, replacing said container or another container in engagement with said hooks for subsequent return to operating position on the plate 31.

Although a particular preferred embodiment of the invention has been disclosed herein for illustrative purposes, it will be understood that variations or modifications thereof which lie within the scope of the invention are fully contemplated unless specifically stated to the contrary in the hereinafter appended claims.

What is claimed is:

1. A machine for mixing battery paste, which includes: a container having an open upper end and adapted for holding the paste ingredients; a hood loosely received over the open end of said container and means for moving said container and said hood with respect to each other so that paste ingredients may be loaded into said container when said hood is spaced therefrom; means within said container for agitating and mixing the ingredients therewithin; a first fan having an inlet opening communicating with the ambient atmosphere and an outlet opening extending through the hood and communicating with the interior of said container whereby air may be moved from the ambient atmosphere into the interior of said container; a second fan having an inlet opening extending through the hood and communicating with the interior of said container and an outlet opening communicating to a point externally of said container, said second fan being adapted for exhausting air and particulate materials entrained in such air from within said container the pressure within said container being less than the ambient pressure.

2. A machine according to claim 1 including means for raising and lowering said hood; a plurality of hooks mounted on said hood and extending downwardly therefrom; means on said container engageable by said hooks so that said container may be lifted upwardly upon upward movement of said hood.

3. A machine for mixing battery paste, which includes: a container, having an open upper end, for holding the paste ingredients; a hood loosely received over the open end of said container; means within said container for agitating and mixing the ingredients; a first fan for supplying cooling air to the interior of said container, said first fan having an inlet opening communicating with the ambient atmosphere and an outlet opening extending through the hood and communicating with the interior of said container; a second fan having an inlet opening extending through said hood and communicating with the interior of said container and an outlet opening communicating to a point externally of said container, said second fan having a greater capacity than said first fan whereby said second fan may draw air into said container between said hood and said container and may exhaust air and particulate materials entrained in such air from within said container.

4. A machine for mixing battery paste, which includes: a container, having an open upper end, for holding the paste ingredients; a hood loosely received over the open end of said container; a plate rotatably supported within said hood, said plate having a plurality of downwardly extending mixing elements thereon received within said container whereby the ingredients may be mixed and agitated upon rotation of said plate; a first fan for supplying cooling air to the interior of said container and having an inlet conduit communicating with the ambient atmosphere and having an outlet conduit extending through said hood and communicating with the interior of said container near a first portion of the periphery of said plate; a second fan having an inlet conduit extending through said hood and communicating with the interior of said container near a second portion of the periphery of said plate, said second portion being circumferentially spaced from said first portion, said second fan having an outlet conduit communicating with a point externally of said container, said second fan having a greater capacity than said first fan whereby said second fan may draw air into said container between said hood and said container and may exhaust air and particulate materials entrained in such air from within said container.

5. A machine for mixing battery paste, which includes: a container, having an open upper end for holding the paste ingredients; a cover structure positioned over the open upper end of the container and including a hood which is loosely received around the upper open end of said container; means for raising and lowering said cover structure; a plate rotatably supported within said hood, said plate having a plurality of downwardly extending mixing elements thereon received within said container whereby the ingredients therewithin may be mixed and agitated upon rotation of said plate; an input fan; means connected to said cover structure defining a scroll for said input fan, said last named means including a plate having a central opening therethrough communicating with the ambient atmosphere; means defining an outlet conduit from said input fan, said outlet conduit extending through said cover structure and within said hood near to the periphery of said plate; an exhaust fan; means connected to said cover structure defining a scroll for said exhaust fan; means defining an inlet conduit extending into said exhaust fan scroll and through said cover member and within said hood and near to the periphery of said plate at a portion thereof substantially diametrically opposite to the outlet opening of said input fan, said scroll for said exhaust fan having a discharge opening extending to a point externally of said container; said exhaust fan having a greater capacity than said input fan whereby said exhaust fan may draw air into said container between said hood and said container, and may exhaust air and particulate materials entrained from within said container.

6. A machine according to claim 5 wherein said container has a peripheral flange adjacent the upper end thereof; a plurality of hooks mounted on said cover structure and extending downwardly therefrom for engaging said flange and lifting said container when said cover structure is raised.

7. A machine for mixing battery paste, which includes: a container, having an open upper end, for holding the paste ingredients; means for rotating said container; a cover structure positioned over the open upper end of the container and having a hood which is loosely received around the open upper end of said container; means for raising and lowering said cover structure; a plate rotatably supported within said hood, said plate having a plurality of downwardly extending mixing elements thereon received within said container whereby the ingredients therewithin may be mixed and agitated upon rotation of said plate; an input fan; means connected to said cover structure above said container defining a scroll for said input fan, said last named means including a plate having a central opening therethrough communicating with the ambient atmosphere; means defining an outlet conduit from said input fan, said outlet conduit extending through said cover structure within said hood adjacent the periphery of said plate; a motor for driving said input fan positioned near said cover structure and said scroll; an exhaust fan; means connected to said cover structure above said container defining a scroll for said exhaust fan; means defining an inlet conduit into said exhaust fan scroll and extending through said cover member and within said hood and adjacent the periphery of said plate on a portion thereof substantially diametrically opposite to the outlet conduit of said input fan, said scroll for said exhaust fan having a discharge opening extending away from said cover structure to a point externally of said container; a motor for driving said exhaust fan and positioned near said cover structure and the scroll for said exhaust fan, said exhaust fan having a greater capacity than said input fan whereby said exhaust fan may draw air into said container between said hood and said container and may exhaust noxious air-borne material from within said container.

8. A machine for mixing battery paste in a container having an open upper end for holding the paste ingredients, comprising in combination: base means; a hood loosely receivable over the open end of said container; means supported on said hood for agitating and mixing the ingredients within said container; means for withdrawing air and particulate materials entrained therein from within said container; means for supporting said container for cooperation with said agitating means; support means mounted fixedly with respect to said base means for supporting said hood for vertical sliding movement with respect to said container, power operated means mounted on said base means and connected to said support means for moving said hood upwardly and downwardly.

9. A machine as defined in claim 8 having a flange around the upper edge of said container, a pair of hooks and means supporting said pair of hooks from said hood by the mechanism provided for lifting said hood whereby said container may be lifted with said hood.

References Cited in the file of this patent

UNITED STATES PATENTS

| | | |
|---|---|---|
| 858,318 | Young et al. | June 25, 1907 |
| 886,768 | De Bogory | May 5, 1908 |
| 1,183,885 | Landis | May 23, 1916 |
| 2,548,340 | Bower | Apr. 10, 1951 |
| 2,696,022 | Steinbock et al. | Dec. 7, 1954 |
| 2,777,313 | Dodge | Jan. 15, 1957 |